(12) United States Patent
Melscoet-Chauvel et al.

(10) Patent No.: US 7,923,093 B2
(45) Date of Patent: Apr. 12, 2011

(54) HIGH POROSITY FILTERS FOR 4-WAY EXHAUST GAS TREATMENT

(75) Inventors: Isabelle Marie Melscoet-Chauvel, Painted Post, NY (US); Gregory Albert Merkel, Corning, NY (US); Steven Bolaji Ogunwumi, Painted Post, NY (US); Tinghong Tao, Big Flats, NY (US); Jianguo Wang, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 1092 days.

(21) Appl. No.: 11/544,271

(22) Filed: Oct. 6, 2006

(65) Prior Publication Data

US 2008/0004171 A1    Jan. 3, 2008

Related U.S. Application Data

(60) Provisional application No. 60/817,722, filed on Jun. 30, 2006.

(51) Int. Cl.
*B32B 3/12* (2006.01)
*B01D 39/06* (2006.01)

(52) U.S. Cl. .......................... 428/116; 55/523
(58) Field of Classification Search .................. None
See application file for complete search history.

(56) References Cited

U.S. PATENT DOCUMENTS

| | | | |
|---|---|---|---|
| 6,284,693 B1 * | 9/2001 | Beall et al. ............... 501/119 |
| 6,773,481 B2 | 8/2004 | Noguchi et al. ............ 55/523 |
| 6,803,086 B2 | 10/2004 | Noguchi et al. ............ 428/116 |
| 6,814,774 B2 | 11/2004 | Ishihara et al. ............ 55/523 |
| 6,818,580 B2 | 11/2004 | Kumazawa et al. .......... 501/119 |
| 6,827,754 B2 | 12/2004 | Suwabe et al. ............ 55/523 |
| 6,864,198 B2 | 3/2005 | Merkel .................... 501/80 |
| 6,887,826 B2 | 5/2005 | Nishimura et al. .......... 502/527.19 |
| 2003/0039598 A1 | 2/2003 | Nishimura et al. .......... 422/177 |
| 2004/0148916 A1 * | 8/2004 | Merkel .................... 55/523 |
| 2004/0261384 A1 | 12/2004 | Merkel et al. ............ 55/523 |
| 2005/0069469 A1 | 3/2005 | Fu et al. ................ 422/177 |
| 2007/0269634 A1 | 11/2007 | Suenobu et al. ........... 428/116 |

FOREIGN PATENT DOCUMENTS

| | | |
|---|---|---|
| DE | 11 2005 000 172 | 1/2007 |
| EP | 0753490 | 1/2002 |
| EP | 1 374 969 | 1/2004 |
| EP | 1 666 436 | 6/2006 |
| WO | 2005/068396 | 7/2005 |

OTHER PUBLICATIONS

S. Ichikawa et al., "Material Development of High Porous SiC for Catalyzed Diesel Particulate Filters", SAE Technical Paper 2003-01-0380.
T. Mizuno et al., "Development of a New DPNR Catalyst", SAE Technical Paper 2004-01-0578.
Y. Kasai et al., "New Cordierite Diesel Particulate Filter Material for the Diesel Particulate—Nox Reduction System", SAE Technical Paper 2004-01-0953.

* cited by examiner

*Primary Examiner* — Gordon R Baldwin
(74) *Attorney, Agent, or Firm* — Matthew B. McNutt

(57) ABSTRACT

Cordierite ceramic articles with high volume percent porosities of at least 64% but less than 80% have controlled median pore sizes and mean coefficients of thermal expansion that impart substantially improved modulus of rupture strengths (MOR) and thermal shock resistance (TSR) to the ceramic articles.

8 Claims, 3 Drawing Sheets

HIGH POROSITY FILTERS FOR 4-WAY EXHAUST GAS TREATMENT

This application claims the benefit of U.S. Provisional Application No. 60/817,722, filed Jun. 30, 2006, entitled "High Porosity Filters for 4-Way Exhaust Gas Treatment".

BACKGROUND OF THE INVENTION

The present invention is in the field of technical ceramics and particularly relates to refractory cordierite ceramics of low thermal expansion and high porosity that exhibit high strengths rendering them particularly suitable for the production of strong, wall-flow filters for the treatment of combustion exhaust gases.

Cordierite ceramic bodies, especially those formed as honeycomb multicellular structures, are utilized in a number of high temperature applications such as catalytic converters, NOx adsorbers, electrically heated catalysts, molten metal filters, regenerator cores, chemical process substrates, catalysts for hydrodesulfurization, hydrocracking, or hydrotreating, and filters such as diesel exhaust particulate filters.

In diesel exhaust filtration, cordierite, being a low-cost material, in combination with offering a low coefficient of thermal expansion (CTE), has been a material of choice. Porous cordierite ceramic filters of the wall-flow type have been utilized for the removal of particles in the exhaust stream from some diesel engines since the early 1980s. A diesel particulate filter (DPF) ideally combines low CTE (for thermal shock resistance), low pressure drop (for engine efficiency), high filtration efficiency (for removal of most particles from the exhaust stream), high strength (to survive handling, canning, and vibration in use), and low cost.

In applications requiring the removal of nitrogen oxides, NOx, from diesel engine exhaust gas, large amounts of catalyst or NOx adsorbers are typically required. In order to minimize increase in pressure drop, high porosity and coarse pore sizes are desired to accommodate the additional NOx catalyst/adsorber. However, both an increase in porosity and larger pore sizes tend to reduce the strength of the ceramic honeycomb.

Further, very low CTE has often been pursued as a means for increasing thermal shock resistance (TSR), and low CTEs in cordierite and some other advanced ceramics have generally been achieved by the presence of microcracking in the ceramic material. Unfortunately, however, the microcracking also serves to further lower the strength of these high-porosity bodies.

Cordierite ceramics offering a combination of high porosity and coarse pore size, e.g. 64-80% porosity with median pore diameters of 10 to 45 μm, have been produced with either very low or very high CTEs. The high CTE ceramics tended to exhibit poor thermal shock performance, while the extensive microcracking associated with the very low CTE ceramics yielded low strength and poor mechanical durability. The latter ceramics are generally of insufficient physical strength as determined by modulus of rupture (MOR) testing for practical use in the mechanically harsh environment of a typical diesel engine exhaust system.

It would thus be an advancement in the art to provide cordierite ceramic bodies that combine both high porosity and coarse median pore diameter for low catalyzed pressure drop, and at the same time intermediate CTEs insuring an improved combination of thermal shock resistance and strength.

SUMMARY OF THE INVENTION

The present invention provides cordierite ceramic honeycomb articles having a novel combination of high volume percent porosity with controlled median pore sizes and mean coefficients of thermal expansion. Control over both the median pore sizes and mean coefficients of expansion has unexpectedly been found to enable substantially improved modulus of rupture strength (MOR) and thermal shock resistance (TSR) to these high porosity ceramics. In specific embodiments, the cordierite ceramic articles of the invention exhibit volume porosities of at least 64% and less than 80%, but with strengths and mean coefficients of thermal expansion that are generally higher than observed in the high porosity ceramics produced in accordance with the prior art.

The ceramic articles of the invention are particularly well suited for use as catalyzed wall-flow diesel particulate filters, in that the guiding limitations on CTE and pore size distribution provide high modulus of rupture (MOR) strengths in combination with good thermal shock resistance, and in that the pore microstructure of the ceramics insures low clean and soot-loaded pressure drop even when coated with effective amounts of catalysts and/or NOx adsorbers. The retention of higher MOR strengths in the cordierite ceramics of the invention is thought to result from reduced levels of microcracking, as manifested in the somewhat higher permissible CTEs, of the products, when compared with prior art products of similar porosity. Thus, in some embodiments, the invention includes cordierite ceramic articles having a porosity of $\geq 64\%$ and $<80\%$ and a median pore size and average coefficient of thermal expansion from 25-800° C. (CTE) falling within one of the following ranges: (i) a CTE$<6.0\times10^{-7}$/° C. at a median pore diameter $(d_{50})\geq 10$ μm and $<18$ μm; (ii) a CTE$<9.0\times10^{-7}$/° C. at a median pore diameter $(d_{50})\geq 18$ μm and $<22$ μm; (iii) a CTE $<10.0\times10^{-7}$/° C. at a median pore diameter $(d_{50})\geq 22$ μm and $\leq 25$ μm; (iv) a CTE$<13.0$ at a median pore diameter $(d_{50})>25$ μm and $<29$ μm; or (v) a CTE$<17.0\times10^{-7}$/° C. and $\geq 3.0\times10^{-7}$/° C. at a median pore diameter $(d_{50})\geq 29$ μm and $\leq 45$ μm. For purposes of the present description the median pore diameter $(d_{50})$ of a cordierite ceramic material is conventionally defined as that pore diameter at which 50% of the pore volume of the material is of finer pore diameter, all pore diameters and percent pore volumes being determined by standard mercury porosimetry methods.

In another aspect more directly reflecting the important relationship between permissible CTE levels and median pore diameters $(d_{50})$, the invention comprises high porosity cordierite ceramic articles having a median pore diameter $(d_{50})$ of at least 10 μm and not more than 45 μm, and a mean CTE in the axial direction as measured over the temperature range (25-800° C.) satisfying the relationship: $0.5(d_{50}-24.0) <$CTE$(25-800° C.)<0.5(d_{50}-5.0)$, when $d_{50}$ is expressed in micrometers and CTE(25-800° C.) is expressed in units of $10^{-7}$/° C. Again these are high porosity cordierite ceramics with volume porosities of at least 64% and less than 80%

In accordance with certain further embodiments of the invention, a narrow pore size distribution provides for a more uniform distribution of the catalyst on the surfaces of the pore walls. A more uniform thickness of the catalyst coating on the pore walls provides a low clean and soot-loaded pressure drop, and also provides for greater contact between the catalyst and the soot and the catalyst and the exhaust gas, thereby promoting a more efficient use of the catalyst. Narrow pore size distribution further provides a lower pressure drop for the catalyzed filter, a higher filtration efficiency, and higher strength.

DESCRIPTION OF THE DRAWINGS

The invention is further described below with reference to the appended drawings, wherein.

DETAILED DESCRIPTION

As noted above, cordierite ceramic articles for applications such as advanced honeycomb supports and filters for the treatment of combustion engine exhaust gases will necessarily include ceramics of very high porosity, but that must also exhibit a mechanical strength sufficiently high, and a thermal expansion coefficient sufficiently low, to insure high thermal shock resistance. Ceramic articles meeting the high porosity requirement include those of at least 64% volume porosity but less than 80% volume porosity. Ceramics of such high porosity are typically relatively weak, especially in the case of low-CTE cordierite ceramics which are necessarily highly microcracked.

The invention provides cordierite ceramic articles exhibiting the required combination of porosity and strength for high TSR through careful control of the thermal expansion and pore size distribution of the cordierite material. Thus we have found that high porosity cordierite ceramics of low to moderate CTEs can in fact offer surprisingly good MOR strengths if the mean pore sizes of the ceramics are reduced in the lower CTE materials.

Figure 1:
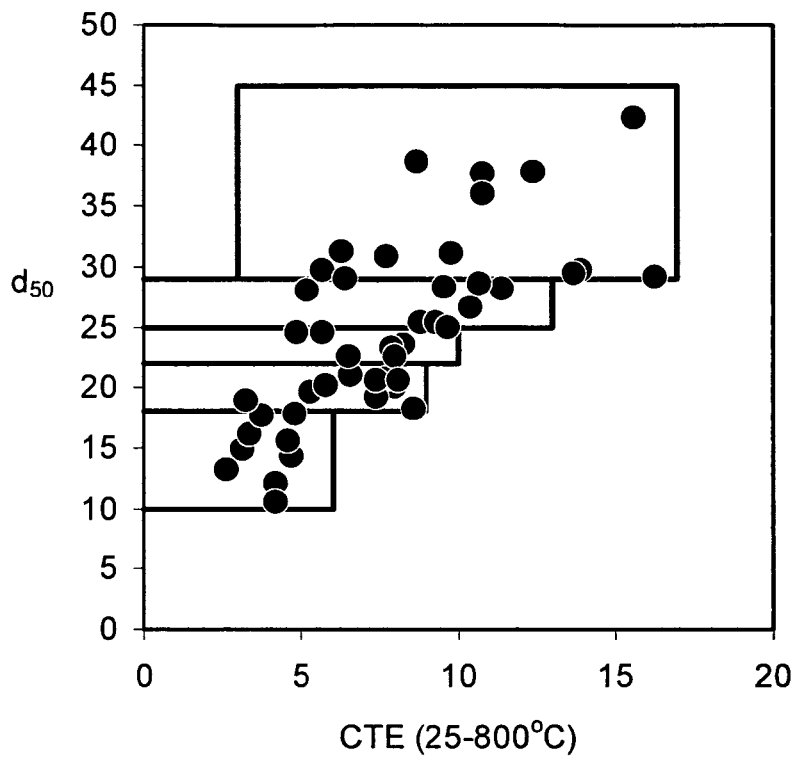
FIGS. 1 and 2 are plots of median pore diameter versus mean CTE from 25 to 800° C. ($10^{-7}/°$ C.) for selected cordierite ceramics of the invention.

The areas of [mean-CTE×median-pore-size] ceramic design space providing the required combination of high strength and high thermal shock resistance are graphically illustrated in FIG. 1 of the drawings, being indicated by five adjoining outlined blocks of acceptable [CTE-pore size] design space in the broader field of the graph. The mean CTEs and median pore sizes ($d_{50}$) for a number of cordierite ceramic articles provided in accordance with the invention are plotted in the drawing, the distribution of those articles on the plot indicating the general trend permitting lower CTEs for cordierite ceramics of lower mean pore sizes.

As summarized above and reflected in the areas outlined in FIG. 1, high-porosity cordierite ceramics according to the invention that will fall within the ranges of acceptable ceramic properties will have a median pore size ($d_{50}$) (as determined by standard mercury porosimetry) and a mean coefficient of thermal expansion as averaged over the temperature range 25-800° C. (CTE) in the axial direction falling within one of the following ranges: (i) a CTE<$6.0 \times 10^{-7}/°$ C. at a median pore diameter ($d_{50}$)≧10 µm and <18 µm, or (ii) a CTE<$9.0 \times 10^{-7}/°$ C. at a median pore diameter ($d_{50}$)≧18 µm and <22 µm, or (iii) a CTE<$10.0 \times 10^{-7}/°$ C. at a median pore diameter ($d_{50}$)≧22 µm and ≦25 µm, or (iv) a CTE<$13.0 \times 10^{-7}/°$ C. at a median pore diameter ($d_{50}$)>25 µm and <29 µm, or (v) a CTE<$17.0 \times 10^{-7}/°$ C. and ≧$3.0 \times 10^{-7}/°$ C. at a median pore diameter ($d_{50}$)≧29 µm and ≦45 µm. Preferred cordierite ceramics of the present invention have median pore diameters and mean coefficients of thermal expansion from 25 to 800° C. that fall within one of the following ranges: (i) a CTE>$2.0 \times 10^{-7}/°$ C. and <$5.0 \times 10^{-7}/°$ C. at a median pore diameter ($d_{50}$)≧10 µm and <18 µm, or (ii) a CTE>$3.0 \times 10^{-7}/°$ C. and <$8.0 \times 10^{-7}/°$ C. at a median pore diameter ($d_{50}$)≧18 µm and <22 µm, or (iii) a CTE>$4.0 \times 10^{-7}/°$ C. and <$9.0 \times 10^{-7}/°$ C. at a median pore diameter ($d_{50}$)≧22 µm and ≦25 µm, or (iv) a CTE>$5.0 \times 10^{-7}/°$ C. and <$11.0 \times 10^{-7}/°$ C. at a median pore diameter ($d_{50}$)>25 µm and <29 µm, or (v) a CTE>$6.0 \times 10^{-7}/°$ C. and <$14.0 \times 10^{-7}/°$ C. and ≧$3.0 \times 10^{-7}/°$ C. at a median pore diameter ($d_{50}$)≧29 µm and ≦39 µm.

Figure 2:
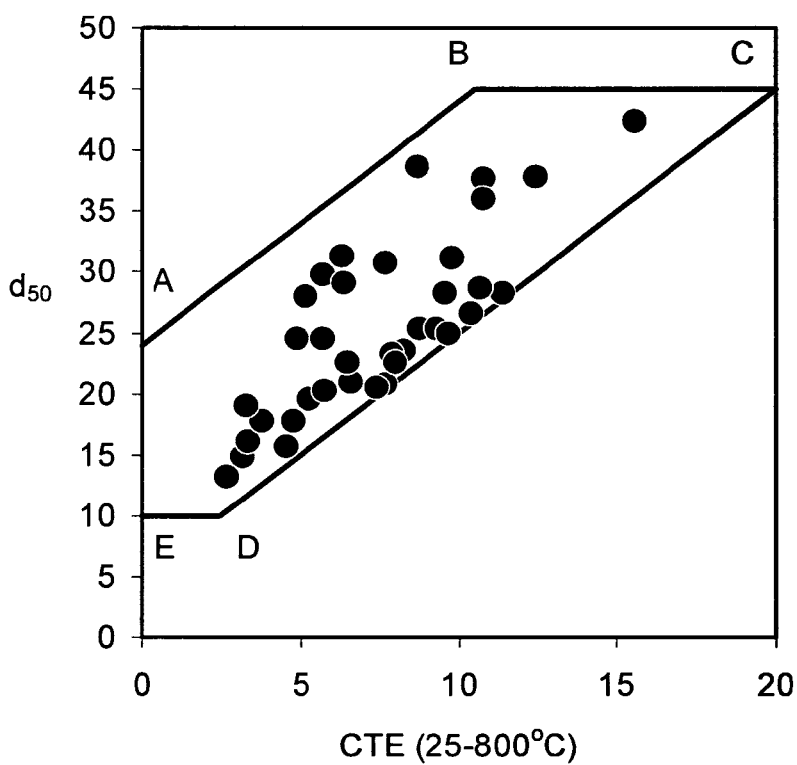

FIG. 2 of the drawings is a plot outlining a field of ceramic design space overlying the exemplary compositions plotted in FIG. 1 that more closely indicates the trend toward reduced median ($d_{50}$) pore sizes in ceramics of lower mean CTE. That field, outlined by the polygon (A-B-C-D-E) in FIG. 2, includes those embodiments of the present invention that exhibit mean coefficients of thermal expansion (CTE) as averaged over the temperature range (25-800° C.) in at least one dimension of the ceramic article satisfying the relationship $0.5(d_{50}-24.0) < CTE(25-800° C.) < 0.5(d_{50}-5.0)$, when $d_{50}$ is expressed in micrometers and mean CTE(25-800° C.) is in units of $10^{-7}/°$ C., and wherein the porosity is at least 64% and less than 80%, and the median pore diameter ($d_{50}$) is at least 10 µm and not more than 45 µm. In accordance with a preferred embodiment, the mean coefficient of thermal expansion (CTE) satisfies the relationship $0.5(d_{50}-24.0) < CTE(25-800° C.) < 0.5(d_{50}-5.0)$, when $d_{50}$ is expressed in micrometers and mean CTE(25-800° C.) is in units of $10^{-7}/°$ C., and wherein the porosity is at least 64% and less than 80%, and the median pore diameter ($d_{50}$) is at least 13 µm and not more than 40 µm, and the mean CTE is at least $3 \times 10^{-7}/°$ C. and not more than $13 \times 10^{-7}/°$ C.

The invention is further described below with reference to particular examples thereof, which are intended to be illustrative and not limiting. Suitable raw materials for the preparation of such examples are set forth in Table 1 below; these and similar materials for such use are desirably selected to insure high mineralogical and chemical purity. Included in Table 1 where determined on selected raw materials are median particle sizes for those materials as measured by standard laser diffraction and/or sedimentation methods.

TABLE 1

Exemplary Raw Materials

| Raw Material | Median Particle Diameter by Laser Diffraction (µm) | Median Particle Diameter by Sedimentation (µm) |
|---|---|---|
| Talc A | 69 | — |
| Talc B | 28 | — |
| Talc C | 23 | 8 |
| Talc D | 22 | — |
| Talc E | 14 | 8 |
| Talc F | 5 | 1.6 |
| Kaolin A | 11 | 7 |
| Kaolin B | 3 | 1 |
| Alumina A | 15 | — |
| Alumina B | 10 | — |
| Alumina C | 3 | — |
| Alumina D | 0.6 | — |
| Alumina E | 4 | — |
| Activated Alumina A | 16 | — |
| Aluminum Hydroxide A | 13 | — |
| Aluminum Hydroxide B | 12 | — |
| Aluminum Hydroxide C | 5 | 3 |
| Quartz A | 25 | — |
| Quartz B | 23 | — |
| Graphite A | 125 | — |

TABLE 1-continued

Exemplary Raw Materials

| Raw Material | Median Particle Diameter by Laser Diffraction (μm) | Median Particle Diameter by Sedimentation (μm) |
|---|---|---|
| Graphite B | 49 | — |
| Graphite C | 35 | — |
| Graphite D | 9 | — |
| Starch A | 45 | — |
| Starch B | 48 | — |
| Starch C | 45 | — |
| Polyethylene Wax A | 18 | — |
| Polyethylene Wax B | 38 | — |
| Farina Flour | 42 | — |

Illustrative combinations of raw materials for manufacturing cordierite ceramics in accordance with the invention, including combinations of the above constituent materials and some others, are set forth in Tables 2 to 8 below.

TABLE 2

Batch Mixtures

| | Batch Composition Number | | | |
|---|---|---|---|---|
| | A1 | A2 | A3 | A4 |
| Talc C | 40.7 | 0 | 20.35 | 0 |
| Talc A | 0 | 40.7 | 20.35 | 40.7 |
| Kaolin B | 16.0 | 16.0 | 16.0 | 16.0 |
| Alumina C | 14.8 | 14.8 | 14.8 | 14.8 |
| Aluminum Hydroxide C | 16.0 | 16.0 | 16.0 | 16.0 |
| Quartz B | 12.5 | 12.5 | 12.5 | 12.5 |
| Graphite A | 0 | 60.0 | 60.0 | 60.0 |
| Starch A | 40.0 | 0 | 0 | 0 |

TABLE 3

Batch Mixtures

| | Batch Composition Number | | | | | | | | | | |
|---|---|---|---|---|---|---|---|---|---|---|---|
| | B1 | B2 | B3 | B4 | B5 | B6 | B7 | B8 | B9 | B10 | B11 |
| Talc C | 0 | 40.7 | 0 | 40.7 | 40.7 | 39.69 | 37.74 | 40.7 | 40.7 | 40.7 | 0 |
| Talc D | 40.7 | 0 | 40.7 | 0 | 0 | 0 | 0 | 0 | 0 | 0 | 38.5 |
| Kaolin B | 16.0 | 16.0 | 16.0 | 16.0 | 16.0 | 15.6 | 14.8 | 16.0 | 16.0 | 0.0 | 0.0 |
| Kaolin A | 0 | 0 | 0 | 0 | 0 | 0 | 0 | 0 | 0 | 16.0 | 12.8 |
| Alumina D | 0 | 0 | 0 | 0 | 0 | 0 | 0 | 0 | 0 | 14.8 | 0 |
| Alumina C | 14.8 | 14.8 | 14.8 | 14.8 | 14.8 | 9.8 | 0 | 14.8 | 14.8 | 0 | 0 |
| Alumina B | 0 | 0 | 0 | 0 | 0 | 0 | 0 | 0 | 0 | 0 | 12.3 |
| Aluminum Hydroxide C | 16.0 | 16.0 | 16.0 | 16.0 | 16.0 | 22.8 | 35.83 | 16.0 | 16.0 | 16.0 | 21.0 |
| Quartz B | 12.5 | 12.5 | 12.5 | 7.5 | 12.5 | 12.19 | 11.59 | 12.5 | 12.5 | 12.5 | 15.4 |
| SiO$_2$ from Silicone Resin | 0 | 0 | 0 | 4.8 | 0 | 0 | 0 | 0 | 0 | 0 | 0 |
| Graphite A | 0 | 0 | 0 | 0 | 0 | 0 | 0 | 20.0 | 60.0 | 0 | 0 |
| Graphite B | 0 | 0 | 0 | 0 | 0 | 0 | 0 | 0 | 0 | 60.0 | 0 |
| Graphite C | 60.0 | 60.0 | 80.0 | 0 | 0 | 0 | 0 | 0 | 0 | 0 | 80.0 |
| Starch A | 0 | 0 | 0 | 40.0 | 40.0 | 40.0 | 40.0 | 20.0 | 0 | 0 | 0 |

TABLE 4

Batch Mixtures

| | Batch Composition Number | | | | | | | | |
|---|---|---|---|---|---|---|---|---|---|
| | B12 | B13 | B14 | B15 | B16 | B17 | B18 | B19 | B20 |
| Talc C | 38.5 | 0 | 38.5 | 40.7 | 0 | 0 | 0 | 0 | 0 |
| Talc D | 0 | 38.5 | 0 | 0 | 39.7 | 39.7 | 40.7 | 0 | 0 |
| Talc A | 0 | 0 | 0 | 0 | 0 | 0 | 0 | 40.7 | 40.7 |
| Kaolin B | 0 | 0 | 0 | 0 | 0 | 0 | 0 | 16.0 | 16.0 |
| Kaolm A | 12.8 | 12.8 | 12.8 | 16.0 | 4.97 | 4.97 | 16.0 | 0 | 0 |
| Alumina C | 0 | 0 | 0 | 0 | 0 | 0 | 0 | 14.8 | 14.8 |
| Alumina B | 12.3 | 12.3 | 12.3 | 0 | 19.4 | 19.4 | 0 | 0 | 0 |
| Alumina A | 0 | 0 | 0 | 14.8 | 0 | 0 | 14.8 | 0 | 0 |
| Aluminum Hydroxide C | 21.0 | 21.0 | 21.0 | 16.0 | 0 | 0 | 16.0 | 16.0 | 16.0 |
| Aluminum Hydroxide A | 0 | 0 | 0 | 0 | 16.2 | 16.2 | 0 | 0 | 0 |
| Quartz B | 15.4 | 15.4 | 15.4 | 12.5 | 19.7 | 19.7 | 12.5 | 9.81 | 11.8 |
| SiO$_2$ from Silicone Resin | 0 | 0 | 0 | 0 | 0 | 0 | 0 | 2.58 | 0.72 |
| Graphite A | 0 | 0 | 0 | 0 | 0 | 0 | 0 | 60.0 | 60.0 |
| Graphite B | 60.0 | 80.0 | 80.0 | 80.0 | 60.0 | 80.0 | 80.0 | 0 | 0 |
| Graphite D | 0 | 0 | 0 | 0 | 0 | 0 | 0 | 0 | 0 |

TABLE 5

Batch Mixtures

| | Batch Composition Number | | | | |
|---|---|---|---|---|---|
| | C1 | C2 | C3 | C4 | C5 |
| Talc D | 41.28 | 38.52 | 38.52 | 38.52 | 38.52 |
| Kaolin A | 13.60 | 12.84 | 12.84 | 12.84 | 12.84 |
| Alumina B | 12.62 | 12.27 | 12.27 | 12.27 | 12.27 |
| Aluminum Hydroxide C | 0 | 20.99 | 20.99 | 20.99 | 20.99 |
| Activated Alumina A | 15.94 | 0 | 0 | 0 | 0 |
| Quartz B | 16.56 | 15.38 | 15.38 | 15.38 | 15.38 |
| Graphite B | 0 | 80.0 | 0 | 20.0 | 25.0 |
| Graphite C | 50.0 | 0 | 0 | 0 | 0 |
| Starch A | 0 | 0 | 40.0 | 0 | 0 |
| Starch B | 0 | 0 | 0 | 20.0 | 25.0 |

TABLE 6

Batch Mixtures

| | Batch Composition Number | | | | | | | |
|---|---|---|---|---|---|---|---|---|
| | C8 | C9 | C10 | C11 | C12 | C13 | C14 | C15 |
| Talc D | 38.52 | 38.52 | 38.52 | 28.89 | 28.89 | 38.52 | 38.52 | 19.26 |
| Talc B | 0 | 0 | 0 | 9.63 | 9.63 | 0 | 0 | 19.26 |
| Kaolin A | 12.84 | 12.84 | 12.84 | 12.84 | 12.84 | 12.84 | 12.84 | 12.84 |
| Alumina B | 12.27 | 12.27 | 12.27 | 12.27 | 12.27 | 12.27 | 12.27 | 12.27 |
| Aluminum Hydroxide C | 20.99 | 20.99 | 20.99 | 20.99 | 20.99 | 20.99 | 20.99 | 20.99 |
| Quartz A | 15.38 | 0 | 0 | 0 | 0 | 0 | 0 | 0 |
| Quartz B | 0 | 15.38 | 15.38 | 15.38 | 15.38 | 15.38 | 15.38 | 15.38 |
| Graphite B | 0 | 0 | 20.0 | 0 | 0 | 0 | 0 | 0 |
| Graphite C | 0 | 0 | 0 | 0 | 0 | 80.0 | 0 | 0 |
| Starch A | 0 | 0 | 20.0 | 35.0 | 30.0 | 0 | 50.0 | 30.0 |
| Starch C | 0 | 20.0 | 0 | 0 | 0 | 0 | 0 | 0 |
| Farina Flour | 35.0 | 0 | 0 | 0 | 0 | 0 | 0 | 0 |

TABLE 7

Batch Mixtures

| | Batch Composition Number | | | | |
|---|---|---|---|---|---|
| | D1 | D3 | D4 | D5 | D6 |
| Talc D | 38.52 | 38.52 | 38.52 | 38.52 | 38.52 |
| Kaolin A | 12.84 | 12.84 | 12.84 | 12.84 | 12.84 |
| Alumina B | 12.27 | 12.27 | 7.27 | 2.27 | 7.27 |
| Alumina E | 0 | 0 | 0 | 0 | 5.00 |
| Aluminum Hydroxide C | 20.99 | 20.99 | 20.99 | 20.99 | 20.99 |
| Aluminum Hydroxide B | 0 | 0 | 5.00 | 10.00 | 0 |
| Quartz A | 15.38 | 15.38 | 15.38 | 15.38 | 15.38 |
| Graphite B | 50.0 | 50.0 | 80.0 | 80.0 | 80.0 |
| Polyethylene Wax A | 20.0 | 10.0 | 0 | 0 | 0 |

TABLE 8

Batch Mixtures

| | Batch Composition Number | | | | | |
|---|---|---|---|---|---|---|
| | D7 | D8 | D9 | D10 | D11 | D12 |
| Talc D | 38.52 | 40.80 | 38.52 | 0 | 0 | 38.52 |
| Talc E | 0 | 0 | 0 | 38.52 | 0 | 0 |
| Talc F | 0 | 0 | 0 | 0 | 38.52 | 0 |
| Kaolin A | 12.84 | 13.60 | 12.84 | 12.84 | 12.84 | 12.84 |
| Alumina B | 12.27 | 13.00 | 12.27 | 12.27 | 12.27 | 12.27 |
| Aluminum Hydroxide C | 20.99 | 0 | 20.99 | 20.99 | 20.99 | 20.99 |
| Activated Alumina A | 0 | 16.31 | 0 | 0 | 0 | 0 |
| Quartz B | 0 | 0 | 0 | 15.38 | 15.38 | 0 |
| Quartz A | 15.38 | 16.29 | 15.38 | 0 | 0 | 15.38 |
| Graphite B | 80.0 | 50.0 | 0 | 0 | 80.0 | 50.0 |
| Graphite C | 0 | 0 | 0 | 80.0 | 0 | 0 |
| Graphite D | 0 | 0 | 80.0 | 0 | 0 | 0 |
| Polyethylene Wax A | 0 | 0 | 0 | 0 | 0 | 0 |
| Polyethylene Wax B | 0 | 0 | 0 | 0 | 0 | 10.0 |

In a typical procedure for the manufacture of cordierite ceramic honeycombs from batch mixtures such as reported above in Tables 2-8, the inorganic raw materials and graphite, starch, flour, or polymer pore formers are mixed with 4% to 6% methylcellulose binder and 0.5 to 1% of a sodium stearate lubricant, and water is worked into the resulting mixture in a stainless steel muller to form a plasticized batch. The plasticized batches thus formed are then extruded to form 2-inch or 5.66-inch diameter cylindrical honeycomb preforms having approximately 200 to 300 cells/inch$^2$ of honeycomb cross-section with cell walls of 0.012 to 0.020-inch thickness. In some cases, plasticized batches were also extruded to form rods having approximately a 0.3-inch diameter cross section. These extruded honeycombs and rods are then dried and subsequently fired in gas or electric kilns to convert the raw materials in the extruded honeycombs into ceramic honeycombs wherein cordierite constitutes the principal crystalline phase (greater than 87% by weight of the crystalline phases comprising the honeycombs). Minor crystalline phases (less than 13% total by weight of the total crystalline phases) of residual mullite, spinel+sapphirine, and alpha-alumina can be detected by x-ray diffractometry in some of these fired honeycombs.

Tables 9 to 18 below report firing and product performance data typical of fired cordierite materials and honeycomb products provided from extruded honeycombs having batch compositions as set forth in Tables 2-8 above. Included in those Tables for each of the products reported are firing parameters useful for initiating and completing the reaction-sintering of the raw batch honeycomb components into cordierite in a manner enabling control over the CTEs and median pore sizes of the ceramics. Also reported for many of the products are selected physical properties typical of the fired materials, as determined on the fired honeycombs or rods.

Referring more particularly to the data in Tables 9-18, the CTE values correspond to the mean coefficients of thermal expansion of the products averaged over the temperature range 25 to 800° C. in units of $10^{-7}$/° C., as measured by dilatometry on specimens oriented parallel to the lengths of the channels of the honeycombs ("axial direction"). The % porosities are the volume percentages of porosity in the walls of the article as measured by mercury porosimetry. The terms $d_{10}$, $d_{50}$, and $d_{90}$ denote the pore diameters, in microns (micrometers—i.e., $10^{-6}$ meters), at which 10%, 50%, and 90% of the total pore volume are of a finer pore diameter, respectively, also as measured by mercury porosimetry. Thus, for example, $d_{90}$ is the pore diameter at which 90% (by volume) of the pores have a smaller diameter (equal to the pore diameter at which the cumulative mercury intrusion volume equals 10% of the total mercury intrusion volume).

The reported flexural strength or modulus of rupture (MOR) values for the fired honeycombs are as measured in four-point bending on either 0.3-inch diameter rods or on 1 inch×½ inch×5 inch (long) cellular bars with lengths measured parallel to the axial direction of the honeycombs. Elastic modulus values at room temperature are measured by sonic resonance techniques on similar 1 inch×½ inch×5 inch cellular bars with lengths parallel to the axial honeycomb direction. Cell geometries are listed as "N/w" where "N" is the cell density in numbers of cells per square inch of honeycomb cross-section and 'W' is the channel wall thickness in units of $10^{-3}$ inches.

Tables 9-18 also report the axial XRD I-ratio (I-ratio measured on the axial cross section of the honeycomb) and the transverse XRD I-ratio (I-ratio measured on the transverse, as-fired wall surface) for some examples. The I-ratio is defined by the relationship:

$$I\text{-ratio}=I(110)/[I(110)+I(002)]$$

where I(110) and I(002) are the peak heights of the XRD reflections from the (110) and (002) planes in the cordierite crystal lattice, based upon hexagonal indexing of the XRD peaks. The I-ratio is measured by x-ray diffractometry using copper Kα radiation on either the axial cross section (orthogonal to the length of the channels) or the transverse surface (as-fired surface of the honeycomb walls). The I-ratios provide a quantitative measure of the degree to which the cordierite crystallites in the honeycomb article are oriented with their negative thermal expansion c-axes parallel to the plane of the honeycomb wall. A high degree of such orientation is desirable because it reduces the CTE of the honeycomb article in both the axial direction (within the plane of the wall, parallel to the lengths of the channels) and radial direction (within the plane of the wall, orthogonal to the lengths of the channels). For randomly oriented cordierite crystals, the axial and transverse I-ratios are both equal to approximately 0.65. Values of transverse I-ratio greater than 0.65 and values of axial I-ratio lower than 0.65 indicate that the cordierite crystals are preferentially oriented with their c-axes parallel to the plane of the wall. If all of the cordierite crystals were to lie with their c-axes in the plane of the wall, the value of the transverse I-ratio would be 1.0.

Tables 9 to 18 also report the weight percentages of residual spinel, mullite, and alpha-alumina as measured by x-ray diffractometry on pulverized samples for some of the fired honeycombs.

TABLE 9

Honeycomb Products

| | Example Number | | | |
|---|---|---|---|---|
| | 1 | 2 | 3 | 4 |
| | Batch ID | | | |
| | A1 | A2 | A3 | A4 |
| 840-950° C. Heating Rate (° C./h) | 75 | 75 | 75 | 75 |
| 1150-1200° C. Heating Rate (° C./h) | 25 | 25 | 25 | 25 |
| 1200-1300° C. Heating Rate (° C./h) | 25 | 25 | 25 | 25 |
| 1300-1360° C. Heating Rate (° C./h) | 25 | 25 | 25 | 25 |
| 1360-1400° C. Heating Rate (° C./h) | 5 | 5 | 5 | 5 |
| Maximum Temperature (° C.) | 1412 | 1412 | 1412 | 1412 |
| Time above 1400° C. (hours) | 13 | 13 | 13 | 13 |
| CTE, 25-800° C. ($10^{-7}$/° C.) | 4.2 | 8.3 | 4.9 | 6.3 |
| Pore Volume (ml/g) | 0.6460 | 0.7031 | 0.7075 | 0.7185 |
| % Porosity | 65.3 | 64.5 | 68.5 | 65.1 |
| $d_{10}$ (μm) | 6.2 | 7.4 | 5.5 | 10.9 |
| $d_{50}$ (μm) | 12.1 | 23.5 | 24.5 | 31.3 |
| $d_{90}$ (μm) | 21.3 | 40.7 | 60.9 | 81.2 |
| $(d_{50} - d_{10})/d_{50}$ | 0.49 | 0.69 | 0.78 | 0.65 |
| $(d_{90} - d_{10})/d_{50}$ | 1.25 | 1.42 | 2.27 | 2.25 |

TABLE 10

Honeycomb Products

| | Example Number | | | | | | |
|---|---|---|---|---|---|---|---|
| | 5 | 6 | 7 | 8 | 9 | 10 | 11 |
| | Batch ID | | | | | | |
| | B1 | B2 | B3 | B4 | B5 | B6 | B7 |
| 840-950° C. Heating Rate (° C./h) | 75 | 75 | 75 | 75 | 75 | 75 | 75 |
| 1150-1200° C. Heating Rate (° C./h) | 25 | 25 | 25 | 25 | 25 | 25 | 25 |
| 1200-1300° C. Heating Rate (° C./h) | 25 | 25 | 25 | 25 | 25 | 25 | 25 |
| 1300-1360° C. Heating Rate (° C./h) | 25 | 25 | 25 | 25 | 25 | 25 | 25 |
| 1360-1400° C. Heating Rate (° C./h) | 5 | 5 | 5 | 5 | 5 | 5 | 5 |
| Maximum Temperature (° C.) | 1412 | 1412 | 1412 | 1412 | 1412 | 1412 | 1412 |
| Time above 1400° C. (hours) | 13 | 13 | 13 | 13 | 13 | 13 | 13 |
| CTE, 25-800° C. ($10^{-7}$/° C.) | 4.2 | 6.4 | 7.0 | 2.7 | 4.7 | 3.2 | 4.6 |
| Transverse XRD I-Ratio | 0.87 | 0.85 | — | — | — | — | — |
| Axial XRD I-ratio | 0.39 | 0.42 | — | — | — | — | — |
| % Mullite | 0 | 0 | 0 | — | — | — | — |
| % Spinel | 4.3 | 3.9 | 3.6 | — | — | — | — |
| % α-Alumina | 0 | 0 | 0 | — | — | — | — |
| Pore Volume (ml/g) | 0.7482 | 0.7099 | 0.7889 | 0.6549 | 0.6545 | 0.7548 | 0.7391 |
| % Porosity | 66.9 | 74.1 | 65.8 | 65.0 | 66.3 | 65.2 | 64.7 |
| $d_{10}$ (μm) | 5.2 | 5.1 | 6.5 | 2.8 | 6.8 | 3.4 | 5.1 |
| $d_{50}$ (μm) | 10.5 | 10.9 | 12.2 | 13.2 | 14.2 | 14.8 | 15.6 |
| $d_{90}$ (μm) | 20.9 | 28.9 | 20.9 | 39.4 | 26.9 | 28.9 | 31.6 |

TABLE 10-continued

Honeycomb Products

| | Example Number | | | | | | |
|---|---|---|---|---|---|---|---|
| | 5 | 6 | 7 | 8 | 9 | 10 | 11 |
| | | | | Batch ID | | | |
| | B1 | B2 | B3 | B4 | B5 | B6 | B7 |
| $(d_{50} - d_{10})/d_{50}$ | 0.50 | 0.53 | 0.47 | 0.79 | 0.52 | 0.77 | 0.67 |
| $(d_{90} - d_{10})/d_{50}$ | 1.50 | 2.18 | 1.18 | 2.77 | 1.42 | 1.71 | 1.70 |
| Cell geometry | 200/12 | — | 200/12 | — | — | — | — |
| Closed Frontal Area (CFA) | 0.31 | — | 0.31 | — | — | — | — |
| MOR, cellular (psi) | 235 | — | 319 | — | — | — | — |
| MOR/CFA (psi) | 758 | — | 1029 | — | — | — | — |
| E, cellular ($10^5$ psi) | 3.20 | — | — | — | — | — | — |
| MOR/E | 0.074% | — | — | — | — | — | — |

TABLE 11

Honeycomb Products

| | Product Number | | | | | | |
|---|---|---|---|---|---|---|---|
| | 12 | 13 | 14 | 15 | 16 | 17 | 18 |
| | | | | Batch ID | | | |
| | B8 | B9 | B10 | B11 | B12 | B13 | B14 |
| 840-950° C. Heating Rate (° C./h) | 35 | 35 | 75 | 75 | 75 | 75 | 75 |
| 1150-1200° C. Heating Rate (° C./h) | 25 | 25 | 25 | 25 | 25 | 25 | 25 |
| 1200-1300° C. Heating Rate (° C./h) | 25 | 25 | 25 | 25 | 25 | 25 | 25 |
| 1300-1360° C. Heating Rate (° C./h) | 18 | 18 | 25 | 25 | 25 | 25 | 25 |
| 1360-1400° C. Heating Rate (° C./h) | 5 | 5 | 5 | 5 | 5 | 5 | 5 |
| Maximum Temperature (° C.) | 1400 | 1400 | 1412 | 1412 | 1412 | 1412 | 1412 |
| Time above 1400° C. (hours) | 11 | 11 | 13 | 13 | 13 | 13 | 13 |
| CTE, 25-800° C. ($10^{-7}$/° C.) | 3.4 | 4.8 | 3.8 | 8.6 | 5.3 | 8.0 | 6.6 |
| Transverse XRD I-Ratio | — | — | 0.85 | 0.87 | — | 0.88 | 0.88 |
| Axial XRD I-ratio | — | — | 0.38 | 0.38 | — | 0.39 | 0.38 |
| % Mullite | — | 0 | 0 | 1.4 | 0.6 | 1.9 | 1.4 |
| % Spinel | — | 3.4 | 3.7 | 3.7 | 3.3 | 2.6 | 3.6 |
| % α-Alumina | — | 0 | 0 | 0 | 0 | 0 | 0 |
| Pore Volume (ml/g) | 0.7125 | 0.6800 | 0.9004 | 0.9437 | 0.8202 | 0.9640 | 0.9492 |
| % Porosity | 66.8 | 64.0 | 67.4 | 71.7 | 66.9 | 72.0 | 72.1 |
| $d_{10}$ (μm) | 2.6 | 5.5 | 8.0 | 10.6 | 9.7 | 11.1 | 11.2 |
| $d_{50}$ (μm) | 16.1 | 17.7 | 17.7 | 18.2 | 19.6 | 20.0 | 21.0 |
| $d_{90}$ (μm) | 32.9 | 37.6 | 33.0 | 32.2 | 38.8 | 35.5 | 42.2 |
| $(d_{50} - d_{10})/d_{50}$ | 0.84 | 0.69 | 0.55 | 0.41 | 0.51 | 0.45 | 0.47 |
| $(d_{90} - d_{10})/d_{50}$ | 1.88 | 1.81 | 1.42 | 1.19 | 1.49 | 1.22 | 1.48 |
| Cell geometry | — | — | 275/14 | 275/14 | 200/12 | 200/12 | 200/12 |
| Closed Frontal Area (CFA) | — | — | 0.41 | 0.41 | 0.31 | 0.31 | 0.31 |
| MOR, cellular (psi) | — | — | 186 | 208 | 284 | 213 | 212 |
| MOR/CFA (psi) | — | — | 454 | 507 | 916 | 687 | 684 |
| E, cellular ($10^5$ psi) | — | — | — | 1.84 | 2.42 | 1.66 | 1.88 |
| MOR/E | — | — | — | 0.113% | 0.117% | 0.128% | 0.113% |

TABLE 12

Honeycomb Products

| | Product Number | | | | | |
|---|---|---|---|---|---|---|
| | 19 | 20 | 21 | 22 | 23 | 24 |
| | | | Batch ID | | | |
| | B15 | B16 | B17 | B18 | B19 | B20 |
| 840-950° C. Heating Rate (° C./h) | 75 | 75 | 75 | 75 | 75 | 75 |
| 1150-1200° C. Heating Rate (° C./h) | 25 | 25 | 25 | 25 | 25 | 25 |
| 1200-1300° C. Heating Rate (° C./h) | 25 | 25 | 25 | 25 | 25 | 25 |
| 1300-1360° C. Heating Rate (° C./h) | 25 | 25 | 25 | 25 | 25 | 25 |
| 1360-1400° C. Heating Rate (° C./h) | 5 | 5 | 5 | 5 | 5 | 5 |
| Maximum Temperature (° C.) | 1412 | 1412 | 1412 | 1412 | 1412 | 1412 |
| Time above 1400° C. (hours) | 13 | 13 | 13 | 13 | 13 | 13 |
| CTE, 25-800° C. ($10^{-7}$/° C.) | 7.9 | 13.3 | 11.4 | 9.6 | 10.8 | 12.4 |

TABLE 12-continued

Honeycomb Products

|  | Product Number | | | | | |
|---|---|---|---|---|---|---|
|  | 19 | 20 | 21 | 22 | 23 | 24 |
|  | Batch ID | | | | | |
|  | B15 | B16 | B17 | B18 | B19 | B20 |
| Transverse XRD I-Ratio | — | — | — | 0.81 | — | — |
| Axial XRD I-ratio | — | — | — | 0.43 | — | — |
| % Mullite | 0 | 0.9 | 0.8 | 0 | — | — |
| % Spinel | 4.4 | 5.4 | 5.8 | 4.5 | — | — |
| % α-Alumina | 0 | 0 | 0 | 0 | — | — |
| Pore Volume (ml/g) | 0.9615 | 0.8621 | 1.0011 | 1.0512 | 0.6233 | 0.7077 |
| % Porosity | 70.9 | 68.5 | 73.2 | 74.5 | 65.2 | 67.4 |
| $d_{10}$ (μm) | 11.7 | 15.1 | 17.0 | 16.6 | 17.2 | 16.7 |
| $d_{50}$ (μm) | 23.2 | 25.4 | 28.2 | 28.3 | 37.7 | 37.8 |
| $d_{90}$ (μm) | 50.3 | 45.5 | 51.1 | 50.7 | 90.4 | 86.2 |
| $(d_{50} - d_{10})/d_{50}$ | 0.50 | 0.40 | 0.40 | 0.41 | 0.54 | 0.56 |
| $(d_{90} - d_{10})/d_{50}$ | 1.66 | 1.20 | 1.21 | 1.21 | 1.94 | 1.84 |
| Cell Geometry | 200/12 | 275/14 | 200/12 | 200/12 | 200/12 | — |
| Closed Frontal Area (CFA) | 0.31 | 0.41 | 0.31 | 0.31 | 0.31 | — |
| MOR, cellular (psi) | 113 | 303 | 233 | 121 | 185 | — |
| MOR/CFA (psi) | 365 | 758 | 752 | 390 | 597 | — |
| F, cellular ($10^5$ psi) | — | — | 1.34 | 1.23 | — | — |
| MOR/E | — | — | 0.174% | 0.098% | — | — |

TABLE 13

Honeycomb Products

|  | Product Number | | | | |
|---|---|---|---|---|---|
|  | 26 | 27 | 28 | 29 | 30 |
|  | Batch ID | | | | |
|  | C1 | C1 | C2 | C2 | C3 |
| 840-950° C. Heating Rate (° C./h) | 75 | 110 | 75 | 110 | 110 |
| 1150-1200° C. Heating Rate (° C./h) | 25 | 40 | 25 | 40 | 40 |
| 1200-1300° C. Heating Rate (° C./h) | 25 | 30 | 25 | 30 | 30 |
| 1300-1360° C. Heating Rate (° C./h) | 25 | 30 | 25 | 30 | 30 |
| 1360-1400° C. Heating Rate (° C./h) | 5 | 30 | 5 | 30 | 30 |
| Maximum Temperature (° C.) | 1410 | 1410 | 1410 | 1410 | 1410 |
| Time above 1400° C. (hours) | 13 | 18 | 13 | 18 | 18 |
| CTE, 25-800° C. ($10^{-7}$/° C.) | 13.9 | 16.3 | 3.3 | 6.5 | 8.8 |
| Pore Volume (ml/g) | 0.8090 | 0.7163 | 0.9910 | 0.9279 | 0.7595 |
| % Porosity | 67.3 | 65.0 | 72.7 | 70.8 | 66.0 |
| $d_{10}$ (μm) | 16.0 | 18.5 | 9.0 | 13.4 | 14.3 |
| $d_{50}$ (μm) | 29.7 | 29.1 | 19.0 | 22.6 | 25.3 |
| $d_{90}$ (μm) | 82.2 | 55.7 | 33.4 | 30.5 | 47.8 |
| $(d_{50} - d_{10})/d_{50}$ | 0.46 | 0.36 | 0.53 | 0.41 | 0.44 |
| $(d_{90} - d_{10})/d_{50}$ | 2.24 | 1.28 | 1.29 | 0.76 | 1.32 |
| MOR, rod (psi) | 645 | — | — | 1014 | 907 |
| E, rod ($10^5$ psi) | — | — | — | 6.16 | — |
| MOR/E | — | — | — | 0.165% | — |

TABLE 14

Honeycomb Products

|  | Product Number | | | |
|---|---|---|---|---|
|  | 31 | 32 | 33 | 34 |
|  | Batch ID | | | |
|  | C4 | C4 | C5 | C5 |
| 840-950° C. Heating Rate (° C./h) | 75 | 110 | 75 | 110 |
| 1150-1200° C. Heating Rate (° C./h) | 25 | 40 | 25 | 40 |
| 1200-1300° C. Heating Rate (° C./h) | 25 | 30 | 25 | 30 |
| 1300-1360° C. Heating Rate (° C./h) | 25 | 30 | 25 | 30 |
| 1360-1400° C. Heating Rate (° C./h) | 5 | 30 | 5 | 30 |
| Maximum Temperature (° C.) | 1410 | 1410 | 1410 | 1410 |

TABLE 14-continued

Honeycomb Products

| | Product Number | | | |
|---|---|---|---|---|
| | 31 | 32 | 33 | 34 |
| | Batch ID | | | |
| | C4 | C4 | C5 | C5 |
| Time above 1400° C. (hours) | 13 | 18 | 13 | 18 |
| CTE, 25-800° C. ($10^{-7}$/° C.) | 7.7 | 5.7 | 7.4 | 9.3 |
| % Mullite | — | — | 1.2 | — |
| % Spinel | — | — | 3.1 | — |
| % α-Alumina | — | — | 0 | — |
| Pore Volume (ml/g) | 0.8007 | 0.7575 | — | 1.0229 |
| % Porosity | 68.2 | 67.4 | 69.4 | 71.6 |
| $d_{10}$ (μm) | 11.5 | 13.2 | 8.3 | 15.4 |
| $d_{50}$ (μm) | 20.7 | 24.5 | 19.2 | 25.4 |
| $d_{90}$ (μm) | 39.7 | 47.1 | 33.5 | 71.0 |
| $(d_{50} - d_{10})/d_{50}$ | 0.54 | 0.46 | 0.57 | 0.39 |
| $(d_{90} - d_{10})/d_{50}$ | 1.29 | 1.39 | 1.31 | 2.19 |
| MOR, rod (psi) | — | 765 | 191 | 665 |
| E, rod ($10^5$ psi) | — | — | 2.54 | 4.27 |
| MOR/E | — | — | 0.075% | 0.156% |

TABLE 15

Honeycomb Products

| | Product Number | | | | |
|---|---|---|---|---|---|
| | 37 | 38 | 39 | 40 | 41 |
| | Batch ID | | | | |
| | C8 | C9 | C10 | C11 | C12 |
| 840-950° C. Heating Rate (° C./h) | 110 | 75 | 110 | 110 | 110 |
| 1150-1200° C. Heating Rate (° C./h) | 40 | 20 | 40 | 40 | 40 |
| 1200-1300° C. Heating Rate (° C./h) | 30 | 50 | 30 | 30 | 30 |
| 1300-1360° C. Heating Rate (° C./h) | 30 | 50 | 30 | 30 | 30 |
| 1360-1400° C. Heating Rate (° C./h) | 30 | 50 | 30 | 30 | 30 |
| Maximum Temperature (° C.) | 1410 | 1420 | 1410 | 1410 | 1410 |
| Time above 1400° C. (hours) | 18 | 15 | 18 | 18 | 18 |
| CTE, 25-800° C. ($10^{-7}$/° C.) | 11.6 | 5.8 | 8.0 | 5.2 | 8.7 |
| % Mullite | — | — | 0.9 | — | — |
| % Spinel | — | — | 3.7 | — | — |
| % α-Alumina | — | — | 0 | — | — |
| Pore Volume (ml/g) | 0.7439 | — | 0.8251 | 0.7591 | 1.0252 |
| % Porosity | 67.8 | 64.9 | 68.1 | 67.3 | 72.9 |
| $d_{10}$ (μm) | 10.5 | 9.4 | 12.8 | 17.2 | 17.6 |
| $d_{50}$ (μm) | 19.7 | 20.2 | 22.5 | 28.0 | 38.7 |
| $d_{90}$ (μm) | 38.3 | 39.7 | 37.2 | 62.7 | 93.1 |
| $(d_{50} - d_{10})/d_{50}$ | 0.46 | 0.53 | 0.43 | 0.39 | 0.55 |
| $(d_{90} - d_{10})/d_{50}$ | 1.41 | 1.50 | 1.08 | 1.63 | 1.95 |
| MOR, rod (psi) | 910 | — | 1042 | 501 | 512 |
| E, rod ($10^5$ psi) | — | 3.59 | 7.38 | — | — |
| MOR/E | — | — | 0.141% | — | — |

TABLE 16

Honeycomb Products

| | Product Number | | | | | |
|---|---|---|---|---|---|---|
| | 42 | 43 | 44 | 45 | 46 | 47 |
| | Batch ID | | | | | |
| | C13 | C13 | C13 | C13 | C14 | C15 |
| 840-950° C. Heating Rate (° C./h) | 75 | 110 | 60 | 120 | 110 | 110 |
| 1150-1200° C. Heating Rate (° C./h) | 25 | 40 | 60 | 120 | 40 | 40 |
| 1200-1300° C. Heating Rate (° C./h) | 25 | 30 | 60 | 120 | 30 | 30 |
| 1300-1360° C. Heating Rate (° C./h) | 25 | 30 | 60 | 120 | 30 | 30 |
| 1360-1400° C. Heating Rate (° C./h) | 5 | 30 | 60 | 120 | 30 | 30 |
| Maximum Temperature (° C.) | 1410 | 1410 | 1415 | 1400 | 1410 | 1410 |

TABLE 16-continued

Honeycomb Products

| | Product Number | | | | | |
|---|---|---|---|---|---|---|
| | 42 | 43 | 44 | 45 | 46 | 47 |
| | Batch ID | | | | | |
| | C13 | C13 | C13 | C13 | C14 | C15 |
| Time above 1400° C. (hours) | 13 | 18 | 15 | 6 | 18 | 18 |
| CTE, 25-800° C. ($10^{-7}$/° C.) | 9.3 | 5.7 | 10.8 | 15.6 | 6.4 | 7.7 |
| Transverse XRD I-Ratio | 0.86 | — | — | — | — | — |
| Axial XRD I-ratio | 0.39 | — | — | — | — | — |
| % Mullite | 0 | — | — | — | — | — |
| % Spinel | 4.0 | — | — | — | — | — |
| % α-Alumina | 1.1 | — | — | — | — | — |
| Pore Volume (ml/g) | 0.9782 | 0.8986 | 0.9023 | 0.7700 | 0.9462 | 0.7688 |
| % Porosity | 74.8 | 68.2 | 70.8 | 66.5 | 71.1 | 68.2 |
| $d_{10}$ (μm) | 10.4 | 18.4 | 22.6 | 25.6 | 17.1 | 18.1 |
| $d_{50}$ (μm) | 18.9 | 29.8 | 36.0 | 42.3 | 29.0 | 30.8 |
| $d_{90}$ (μm) | 34.2 | 54.6 | 80.6 | 109.8 | 69.9 | 80.3 |
| $(d_{50} - d_{10})/d_{50}$ | 0.45 | 0.38 | 0.37 | 0.39 | 0.41 | 0.41 |
| $(d_{90} - d_{10})/d_{50}$ | 1.25 | 1.22 | 1.61 | 1.99 | 1.82 | 2.02 |
| MOR, rod (psi) | — | 690 | 700 | 503 | 540 | 520 |
| E, rod ($10^5$ psi) | — | — | — | — | — | — |
| MOR/E | — | — | — | — | — | — |

TABLE 17

Honeycomb Products

| | Product Number | | | | | |
|---|---|---|---|---|---|---|
| | 48 | 50 | 51 | 52 | 54 | 55 |
| | Batch ID | | | | | |
| | D1 | D3 | D3 | D4 | D5 | D6 |
| 840-950° C. Heating Rate (° C./h) | 75 | 110 | 75 | 110 | 110 | 75 |
| 1150-1200° C. Heating Rate (° C./h) | 25 | 40 | 25 | 40 | 40 | 25 |
| 1200-1300° C. Heating Rate (° C./h) | 25 | 30 | 25 | 30 | 30 | 25 |
| 1300-1360° C. Heating Rate (° C./h) | 25 | 30 | 25 | 30 | 30 | 25 |
| 1360-1400° C. Heating Rate (° C./h) | 5 | 30 | 5 | 30 | 30 | 5 |
| Maximum Temperature (° C.) | 1410 | 1410 | 1410 | 1410 | 1405 | 1410 |
| Time above 1400° C. (hours) | 13 | 18 | 13 | 18 | 12 | 13 |
| CTE, 25-800° C. ($10^{-7}$/° C.) | 7.4 | 9.7 | 8.1 | 9.8 | — | 10.4 |
| Transverse XRD I-Ratio | 0.87 | 0.87 | 0.86 | 0.86 | 0.87 | 0.88 |
| Axial XRD I-ratio | 0.37 | 0.39 | 0.40 | 0.38 | 0.44 | 0.37 |
| % Mullite | 0.9 | 0.0 | 1.2 | 1.0 | 0.6 | 1.9 |
| % Spinel | 3.4 | 4.5 | 3.1 | 3.2 | 4.7 | 4.2 |
| % α-Alumina | 0.0 | 0.6 | 0.0 | 0.0 | 0.0 | 0.0 |
| Pore Volume (ml/g) | 0.9588 | 0.8341 | 0.8806 | 0.8685 | 0.8533 | 0.8850 |
| % Porosity | 71.0 | 66.3 | 69.2 | 71.3 | 70.5 | 68.2 |
| $d_{10}$ (μm) | 12.3 | 15.9 | 12.4 | 21.1 | 21.6 | 17.7 |
| $d_{50}$ (μm) | 20.6 | 24.9 | 20.6 | 31.1 | 33.3 | 26.6 |
| $d_{90}$ (μm) | 36.4 | 47.4 | 39.4 | 52.9 | 64.9 | 47.0 |
| $(d_{50} - d_{10})/d_{50}$ | 0.40 | 0.36 | 0.40 | 0.32 | 0.35 | 0.33 |
| $(d_{90} - d_{10})/d_{50}$ | 1.17 | 1.27 | 1.31 | 1.02 | 1.30 | 1.11 |
| MOR, rod (psi) | 732 | 821 | 905 | — | — | 825 |

TABLE 18

Honeycomb Products

| | Product Number | | | | | |
|---|---|---|---|---|---|---|
| | 56 | 57 | 58 | 59 | 60 | 61 |
| | Batch ID | | | | | |
| | D7 | D8 | D9 | D10 | D11 | D12 |
| 840-950° C. Heating Rate (° C./h) | 110 | 110 | 110 | 110 | 75 | 75 |
| 1150-1200° C. Heating Rate (° C./h) | 40 | 40 | 40 | 40 | 25 | 25 |
| 1200-1300° C. Heating Rate (° C./h) | 30 | 30 | 30 | 30 | 25 | 25 |
| 1300-1360° C. Heating Rate (° C./h) | 30 | 30 | 30 | 30 | 25 | 25 |

TABLE 18-continued

Honeycomb Products

| | Product Number | | | | | |
|---|---|---|---|---|---|---|
| | 56 | 57 | 58 | 59 | 60 | 61 |
| | Batch ID | | | | | |
| | D7 | D8 | D9 | D10 | D11 | D12 |
| 1360-1400° C. Heating Rate (° C./h) | 30 | 30 | 30 | 30 | 5 | 5 |
| Maximum Temperature (° C.) | 1405 | 1405 | 1405 | 1405 | 1410 | 1410 |
| Time above 1400° C. (hours) | 12 | 12 | 12 | 12 | 13 | 13 |
| CTF, 25-800° C. ($10^{-7}$/° C.) | 10.7 | 13.7 | 14.3 | 12.6 | 7.0 | — |
| Transverse XRD I-Ratio | 0.88 | 0.83 | 0.84 | 0.87 | 0.82 | 0.85 |
| Axial XRD I-ratio | 0.38 | 0.41 | 0.39 | 0.42 | 0.46 | 0.40 |
| % Mullite | 2.7 | 1.5 | 2.5 | 1.4 | 0.6 | 1.4 |
| % Spinel | 3.9 | 8.5 | 7.4 | 6.8 | 2.4 | 3.3 |
| % α-Alumina | 0.0 | 0.6 | 1.0 | 1.3 | 0.0 | 0.0 |
| Pore Volume (ml/g) | 0.8698 | 0.6869 | 0.8928 | 0.9048 | 0.9917 | 0.9363 |
| % Porosity | 69.6 | 67.6 | 69.6 | 71.4 | 74.7 | 69.8 |
| $d_{10}$ (μm) | 20.1 | 18.1 | 17.7 | 14.3 | 6.0 | 10.8 |
| $d_{50}$ (μm) | 28.6 | 29.4 | 26.8 | 20.9 | 14.6 | 20.2 |
| $d_{90}$ (μm) | 48.8 | 54.7 | 57.8 | 34.7 | 25.9 | 37.8 |
| $(d_{50} - d_{10})/d_{50}$ | 0.30 | 0.39 | 0.34 | 0.32 | 0.59 | 0.46 |
| $(d_{90} - d_{10})/d_{50}$ | 1.00 | 1.24 | 1.50 | 0.98 | 1.36 | 1.34 |
| MOR, rod (psi) | — | — | 437 | — | 605 | 837 |

The porosity, median pore size, and mean CTEs of the bodies of the present invention as exemplified above are selected to provide a high strength while maintaining low pressure drop and high thermal shock resistance when the bodies are configured for use as honeycomb wall flow filters. For best performance in that configuration the honeycombs should be formed of ceramics having a modulus of rupture (flexural strength) as measured by the four-point bending method on a (non-cellular) rod or (non-cellular) bar of the ceramic material that is at least 500 psi, more preferably at least 700 psi, still more preferably at least 900 psi, and most preferably at least 1000 psi. When measured on cellular bodies the values of MOR are proportional to the closed frontal area (CFA) of a cross section of the cellular body taken transverse to the axial direction of the honeycomb structure. The CFA is defined as the solid fraction of the cross sectional area of the specimen, i.e., the combined areas of the porous walls and wall intersections. Thus, the CFA is equal to $\{w[2(N^{-0.5})-w]N\}$, where w is the wall thickness in inches and N is the cell density in units of (inches)$^{-2}$. Desirably the value of MOR/CFA for cellular structures to be used for wall flow filter construction will be at least 500 psi, preferably at least 700 psi, still more preferably at least 900 psi, and most preferably at least 1000 psi.

Cordierite ceramics selected for wall flow filters will advantageously also exhibit a high strain tolerance, defined as the ratio of the MOR of the ceramic to its elastic modulus E, again where the MOR of the ceramic is its modulus of rupture at room temperature and E is its elastic modulus at room temperature. Both of the MOR and E values should be determined on solid rods, or both should be determined on cellular honeycomb samples as measured along axes parallel with the direction of channel orientation through the body. In the later case the honeycombs should also be of the same cell geometry (same w and N). For wall flow filter applications, it is preferred that materials exhibit a strain tolerance as fired of at least 0.09%, preferably 0.10%, more preferably at least 0.12%, still more preferably at least 0.14%, and especially at least 0.16%. A high strain tolerance is useful because it can result in a higher thermal shock resistance for a given CTE.

Based on composition studies such as outlined in Tables 1-18 above, a range of cordierite ceramic properties has been identified that is particularly well adapted for use in the manufacture of high porosity wall flow filter substrates. Cordierite ceramics within that range will have percent porosities in the range: 64%≦% porosity ≦77%, and will have a median pore diameter ($d_{50}$) simultaneously satisfying the limitations: (i) 18 μm<$d_{50}$≦50 μm; (ii) $d_{50}$>158−2.0(% porosity); and (iii) $d_{50}$<210−2.5(% porosity). The median pore diameter will preferably fall below 30 μm in the higher porosity cordierite ceramics within that range.

Figure 3:
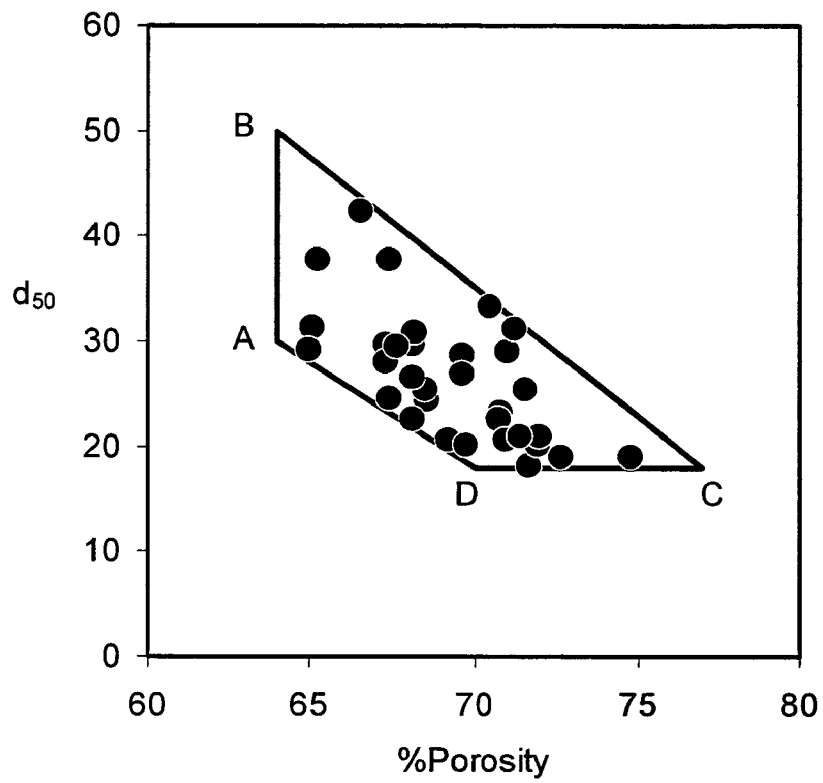
FIGS. 3 and 4 are plots of median pore diameter versus porosity for selected cordierite ceramics of the invention.

The field of porosity/median pore size within which these ceramics will fall is illustrated in FIG. 3 of the drawings, wherein compositions simultaneously satisfying the foregoing limits on porosity and pore size are located within the quadrilateral area A-B-C-D outlined in the drawing. Again providing lower median pore diameters in the higher porosity materials within the disclosed range enables higher MOR strengths for those ceramics than otherwise attainable.

In yet another aspect of the invention, a field of cordierite ceramic design that includes many of the ceramics depicted in FIG. 3 of the drawings, plus some additional high MOR/high TSR materials lying outside of the design ranges covered by the A-B-C-D quadrilateral of FIG. 3, has been identified. Cordierite ceramics falling within those design limits will satisfy one of the following sets of requirements:

(i) a median pore diameter in the range >25 um and <46 um with a porosity in the range >64% and ≦67%, or (ii) a median pore diameter in the range >21 um and <42 um with a porosity in the range >67% and ≦68%, or (iii) a median pore diameter in the range ≧19 um and <40 um with a porosity in the range >68% and <71%, or (iv) a median pore diameter in the range >18 um and <35 um with a porosity in the range ≧71% and <73%, or (v) a median pore diameter in the range >10 um and <30 um with a porosity in the range ≧73% and <75%. The preferred ceramics within that field of porosity design will have median pore diameters <30 μm.

Figure 4:
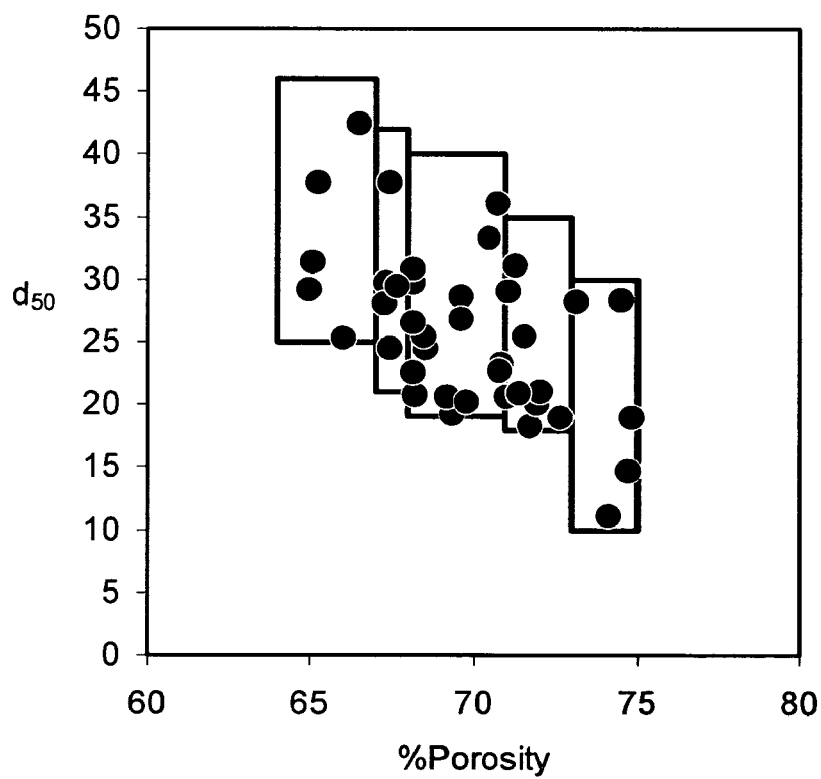

FIG. 4 of the drawings plots median pore diameter (d50) in microns versus porosity in volume percent for a number of examples of cordierite ceramics simultaneously meeting one of the above requirements in accordance with the invention. Thus the plotted examples fall within one of the five rectangles superimposed on the field of the drawing that cover the five areas of pore design corresponding to the foregoing five sets of porosity and pore size limitations.

In selecting a cordierite ceramic material design for a wall flow filter application from among the compositions described above and disclosed in FIGS. 1-4 of the drawings, it is particularly preferred for best strength and thermal shock resistance that the porosity and median pore size ($d_{50}$) fall within the ranges of: 65% ≦porosity ≦75% and 15≦$d_{50}$≦28 µm, especially 18≦$d_{50}$≦25 µm. The mean coefficient of thermal expansion from 25 to 800° C., CTE(25-800), will desirably be ≦15×10$^{-7}$/° C., preferably ≦10×10$^{-7}$/° C., more preferably ≦8×10$^{-7}$/° C., and most preferably ≦6×10$^{-7}$/° C.

The soot-loaded pressure drop of wall flow filters fabricated from these ceramics will depend to some degree on the distributions of pore sizes within the broader range of pore sizes present in the material. For wall flow filter applications employing these high porosity ceramics, it is preferred that the pore size distribution value ($d_{50}$-$d_{10}$)/$d_{50}$ be ≦0.50, more preferably ≦0.40, and most preferably ≦0.35. Further, the value of the pore size distribution parameter $D_b$, defined as ($d_{90}$-$d_{10}$)/$d_{50}$ and indicative of the breadth of the pore size distribution in the material, should be ≦1.7, preferably ≦1.4, more preferably ≦1.2, and most preferably ≦1.0. Further, the value of $d_{90}$ should be ≦60 µm, more preferably ≦50 µm, and most preferably ≦40 µm, while the value of $d_{10}$ should be ≧10 µm, preferably ≧12 µm, and most preferably ≧15 µm.

Figure 5:
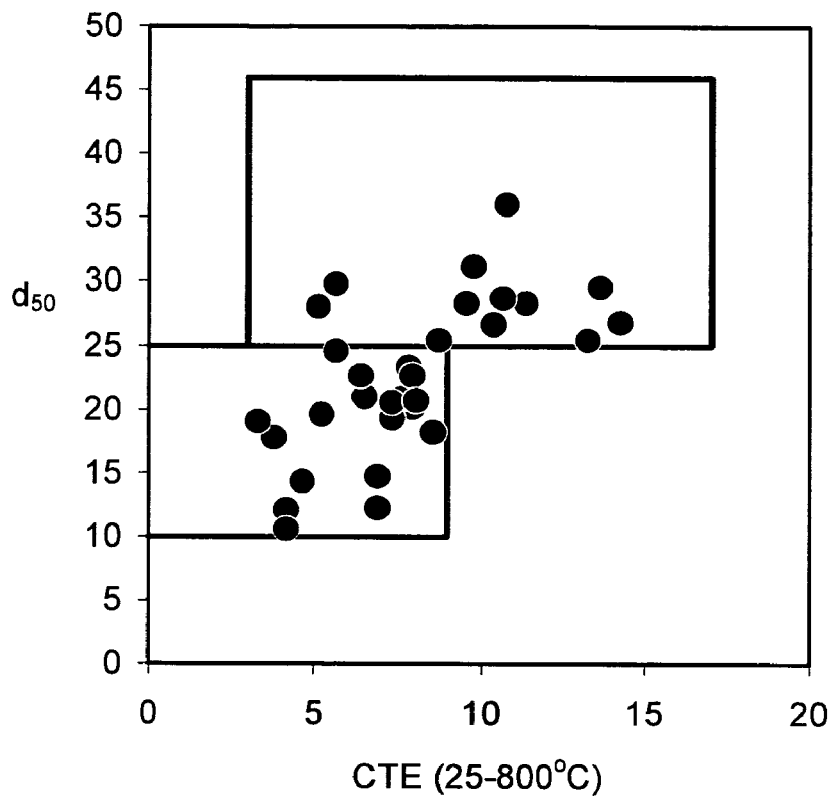
FIG. 5 is a plot of median pore diameter ($d_{50}$) versus mean CTE from 25 to 800° C. ($10^{-7}/°$ C.) for selected cordierite ceramics of the invention exhibiting a narrow pore size distribution.
Figure 6:
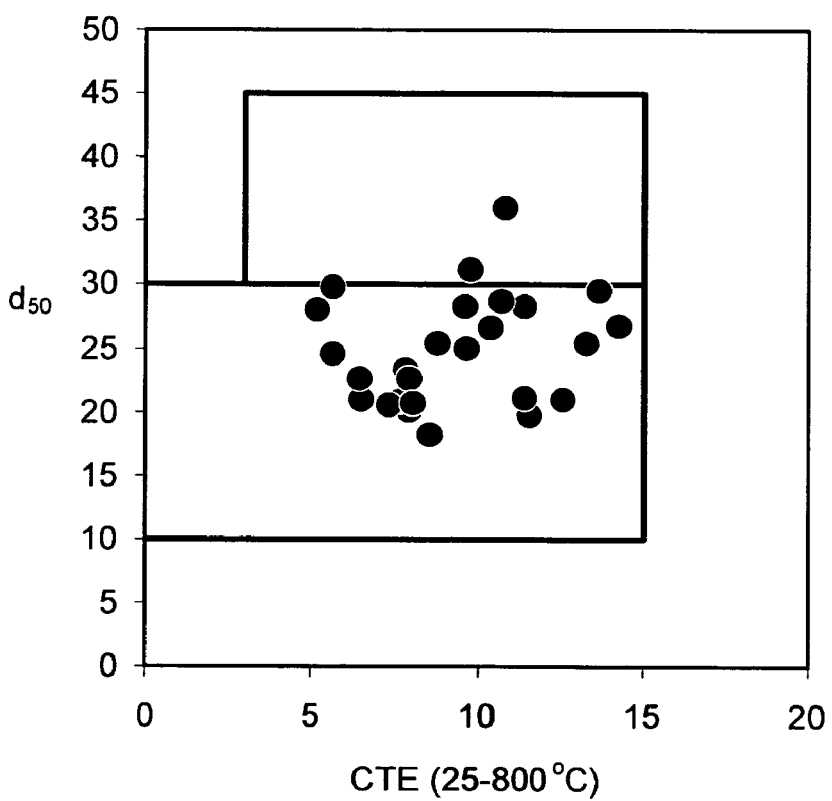
FIG. 6 is a plot of median pore diameter ($d_{50}$), versus mean CTE from 25 to 800° C. ($10^{-7}/°$ C.) for selected cordierite ceramics of the invention having narrow pore size distributions and small volume fractions of very fine pores.

Within the family of high porosity (>65% and <80%) cordierite ceramics having narrow pore size distributions such that ($d_{90}$-$d_{10}$)/$d_{50}$<1.70, best thermal-mechanical properties are observed when the median pore diameter ($d_{50}$) is maintained in the range >10 µm and ≦25 µm at CTE(25-800) values of <9.0×10$^{-7}$/° C., or when the median pore diameter ($d_{50}$) is maintained in the range >25 µm and <46 µm at CTE(25-800) values ≧3.0×10$^{-7}$/° C. and ≦17.0×10$^{-7}$/° C. FIG. 5 of the drawings illustrates the above two ranges of porosity and CTE. The group exhibiting higher CTE values, indicative of less microcracking and therefore higher strength, exhibit good TSR at larger median pore sizes ($d_{50}$). All of the materials plotted have greater than 65% porosity and less than 80% porosity, and all have a $D_b$ value [($d_{90}$-$d_{10}$)/$d_{50}$]<1.70. It is especially preferred that these bodies exhibit either a CTE(25-800)≧3.0×10$^{-7}$/° C. and ≦9.0×10$^{-7}$/° C. with a median pore diameter ($d_{50}$) in the range >10 µm and ≦25 µm, or a CTE(25-800)≧5.0×10$^{-7}$/° C. and ≦15.0×10$^{-7}$/° C. with a median pore diameter ($d_{50}$) in the range >25 µm and ≦36 µm In a somewhat narrower range of high porosity materials with narrow pore size distributions, i.e. ceramics having porosities >65% and <75% and pore size distributions $D_b$ [($d_{90}$-$d_{10}$)/$d_{50}$]<1.70, pressure drop, TSR and MOR levels favor ceramics with $d_{10}$ values ≧10 µm and either (i) median pore diameters of >10 µm and <30 µm with CTE(25-800) values <15.0×10$^{-7}$/° C., or (ii) median pore diameters ≧30 µm and ≦45 µm with CTE(25-800) values ≧3.0×10$^{-7}$/° C. and <15.0×10$^{-7}$/° C. FIG. 6 of the drawings plots median pore sizes $d_{50}$ and mean CTE values (25 to 800° C., 10$^{-7}$/° C.) for examples within the above ranges of median pore size and CTE. All examples within the outlined ranges of FIG. 6 have greater than 65% porosity and less than 75% porosity, all have narrow pore size distributions ($D_b$) satisfying [($d_{90}$-$d_{10}$)/$d_{50}$]<1.70, and all have $d_{10}$ values ≧10 µm. It is preferred that such bodies have porosities >65% and <75%, pore size distributions $D_b$ [($d_{90}$-$d_{10}$)/$d_{50}$]<1.70, $d_{10}$ values ≧10 µm, median pore diameters of ≧18 µm and ≦32 µm with CTE (25-800) values ≧5.0×10$^{-7}$/° C. and ≦15.0×10$^{-7}$/° C. Even more preferred are ceramics with CTEs<9×10$^{-7}$/° C. and median pores sizes $d_{50}$ in the range: 18≦$d_{50}$≦30 µm, and % porosities in the range 66%<% porosity <73%.

As noted above, the high porosity cordierite ceramics of the invention offer particular advantages for applications such as honeycomb wall flow filters for the removal of particulates from fuel combustion exhaust gases, especially exhaust gases from diesel engines. The most difficult of those applications involves the use of these ceramics in honeycomb configurations as combined filters/catalyst supports, wherein a catalyst or adsorber for the removal of nitrogen oxides (NOx) from the exhaust stream is disposed on the high porosity honeycombs. Particularly preferred in the latter case are cordierite ceramic honeycombs having a CTE<10.0×10$^{-7}$/° C. (or more preferably <8.0×10$^{-7}$/° C.), a median pore diameter $d_{50}$ of ≧20 µm and ≦28 µm, a porosity of >65% and <75%, a value of $d_{10}$>11 µm, and a value of $d_{90}$<50 µm. Honeycombs with these properties having $D_b$ values [($d_{90}$-$d_{10}$)/$d_{50}$]≦1.5 and ($d_{50}$-$d_{90}$)/$d_{50}$ values ≦0.45 will be selected for best filtration performance.

We claim:

1. A cordierite ceramic article having at least 64% porosity and less than 80% porosity, a median pore diameter ($d_{50}$) of at least 10 µm and not more than 45 µm, a mean CTE (25-800° C.) in the axial direction wherein 0.5($d_{50}$-24.0)<CTE (25-800° C.)<0.5($d_{50}$-5.0) wherein $d_{50}$ is expressed in micrometers and CTE (25-800° C.) is expressed in units of 10$^{-7}$/° C., and a modulus of rupture MOR flexural strength of at least 500 psi as measured on a non-cellular rod or bar, or a ratio of modulus of rupture strength /closed frontal area MOR/CFA of at least 500 psi as measured on a cellular bar.

2. A cordierite ceramic article in accordance with claim 1 having a % porosity in the range: 64% ≦%porosity ≦77% and a median pore diameter ($d_{50}$), in micrometers, wherein:
   (i) 18 µm<$d_{50}$≦50 µm;
   (ii) $d_{50}$>158-2.0(% porosity); and
   (iii) $d_{50}$<210-2.5(% porosity).

3. A cordierite ceramic honeycomb article in accordance with claim 1 having a mean CTE<10.0×10$^{-7}$/° C., a median pore diameter ≧20 µm, a porosity >65% and <75%, a value of $d_{10}$>11 µm, and a value of $d_{90}$<50 µm.

4. A cordierite ceramic article in accordance with claim 1 which is a honeycomb wall flow filter.

5. A cordierite ceramic article in accordance with claim 1 which has a strain tolerance (MOR/E) of at least 0.10%.

6. A cordierite ceramic article in accordance with claim 5 which has a strain tolerance ratio MOR/E of at least 0.12% and one of (i) a modulus of rupture MOR flexural strength of at least 600 psi as measured on a non-cellular rod or bar, or (ii) a modulus of rupture strength/closed frontal area ratio of MOR/CFA of at least 600 psi as measured on a cellular bar.

7. A cordierite ceramic article in accordance with claim 5 which has a strain tolerance ratio MOR/E of at least 0.14% and one of (i) a modulus of rupture MOR flexural strength of at least 700 psi as measured on a non-cellular rod or bar, or (ii) a ratio of modulus of rupture strength/closed frontal area MOR/CFA of at least 700 psi as measured on a cellular bar.

8. A cordierite ceramic article in accordance with claim 1 having a porosity of ≧64% and <80% and a median pore diameter ($d_{50}$) and average coefficient of thermal expansion from 25-800° C. (CTE) falling within the ranges:
   (i) CTE <6.0×10$^{-7}$/° C., and median pore diameter ($d_{50}$)≧10 µm and <18 µm.

* * * * *

UNITED STATES PATENT AND TRADEMARK OFFICE
CERTIFICATE OF CORRECTION

| | |
|---|---|
| PATENT NO. | : 7,923,093 B2 |
| APPLICATION NO. | : 11/544271 |
| DATED | : April 12, 2011 |
| INVENTOR(S) | : Isabelle Marie Melscoet-Chauvel et al. |

It is certified that error appears in the above-identified patent and that said Letters Patent is hereby corrected as shown below:

*Col.*    *Line*             *Description*

22     40     "pore diameter $\geq 20$ μm" should read

--pore diameter $\geq 20$ μm and $\leq 28$ μm--.

Signed and Sealed this
Thirtieth Day of October, 2012

David J. Kappos
*Director of the United States Patent and Trademark Office*